United States Patent [19]

Duchow et al.

[11] Patent Number: 4,791,972
[45] Date of Patent: Dec. 20, 1988

[54] FILLER RING FOR A VEHICLE WHEEL AND TIRE ASSEMBLY

[75] Inventors: Alfred Duchow, Hohenhameln; Dietmar Haack, Springe; Udo Frerichs, Langenhagen; Werner Flebbe, Neustadt a. Rbge.; Heinz-Dieter Rach, Garbsen, all of Fed. Rep. of Germany

[73] Assignee: Continental Aktiengesellschaft, Hanover, Fed. Rep. of Germany

[21] Appl. No.: 25,487

[22] Filed: Mar. 13, 1987

[30] Foreign Application Priority Data

Mar. 14, 1986 [DE] Fed. Rep. of Germany ... 8607101[U]

[51] Int. Cl.$^4$ ...................... B60B 21/02; B60C 15/02
[52] U.S. Cl. .................... 152/398; 152/375; 152/381.6; 152/DIG. 20
[58] Field of Search ............... 152/375, 381.6, 393, 152/396, 397, 398, 401, DIG. 10, DIG. 20

[56] References Cited

U.S. PATENT DOCUMENTS

| 1,949,695 | 3/1934 | Shoemaker | 152/DIG. 20 |
| 4,408,647 | 10/1983 | Kuhn et al. | 152/DIG. 20 |
| 4,623,009 | 11/1986 | Seitz et al. | 152/DIG. 20 |

FOREIGN PATENT DOCUMENTS

| 3000428 | 7/1981 | Fed. Rep. of Germany ... 152/DIG. 20 |
| 3529508 | 2/1987 | Fed. Rep. of Germany ... 152/DIG. 20 |
| 3529513 | 2/1987 | Fed. Rep. of Germany ... 152/DIG. 20 |
| 3531177 | 3/1987 | Fed. Rep. of Germany ... 152/DIG. 20 |

Primary Examiner—James B. Marbert
Attorney, Agent, or Firm—Becker & Becker, Inc.

[57] ABSTRACT

A filler ring, made of rubber or synthetic material, for a vehicle wheel and pneumatic tire assembly where the beads of the tire are mounted on the radially inner periphery of a wheel rim next to essentially radially inwardly extending rim flanges. The filler ring covers a space located axially inwardly of a rim flange. The filler ring includes at least two planes of circumferential hollow chambers, with the planes of hollow chambers being superimposed on one another in a radial direction, and with at least two hollow chambers, which are successively arranged in an axial direction, being provided in each of the planes of such hollow chambers.

10 Claims, 2 Drawing Sheets

FILLER RING FOR A VEHICLE WHEEL AND TIRE ASSEMBLY

BACKGROUND OF THE INVENTION

The present invention relates to a filler ring, made of rubber or synthetic material, for a vehicle wheel and pneumatic tire assembly where the beads of the tire are mounted on the radially inner periphery of a wheel rim next to essentially radially inwardly extending rim flanges. The filler ring covers a space located axially inwardly of a rim flange.

A filler ring of this general type is disclosed, for example, in German Offenlegungsschrift No. 33 12 482 Huinink et al dated Oct. 11, 1984 and German Offenlegungsschrift No. 33 31 870 Mauk et al dated Mar. 21, 1985. These known filler rings primarily serve to completely, in a watertight manner, fill the installation space axially inwardly of the tire beads in such a way that no dirty water and spray can enter this space, because otherwise this water would be prevented by the tire beads from subsequently flowing to the sides and out. For manufacturing reasons, efforts have been made to produce the filler rings from one piece, for example by extruding endless profiled members and subsequently cutting them to length. In so doing, up to now one had to accept the fact that such rings caused considerable difficulties during assembly.

It is therefore an object of the present invention to optimize the heretofore known filling rings in such a way that it is easy to install them in a vehicle wheel and tire assembly.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The filler ring of the present invention is characterized primarily in that it comprises at least two planes of annular or circumferential hollow chambers, with these planes of hollow chambers being superimposed on one another in a radial direction, and with at least two hollow chambers, which are successively arranged in an axial direction, being provided in each of the planes of such hollow chambers.

The present invention offers the advantage that despite a greater flexibility or resiliency of the wall of the filler ring, the sealing effect is improved, especially in the radially and axially inner region of the filler ring where the latter rests against the wall of the drop center of the rim ring. By optimizing the cross-sectional contour of the filling ring, the result is that even during slight movements of the tire bead under extreme driving conditions, the filler ring does not break away radially inwardly at specific locations, and thus fully maintains its sealing effect.

Specific further features of the present invention will be described in detail subsequently.

DESCRIPTION OF PREFERRED EMBODIMENTS

Figure 1:
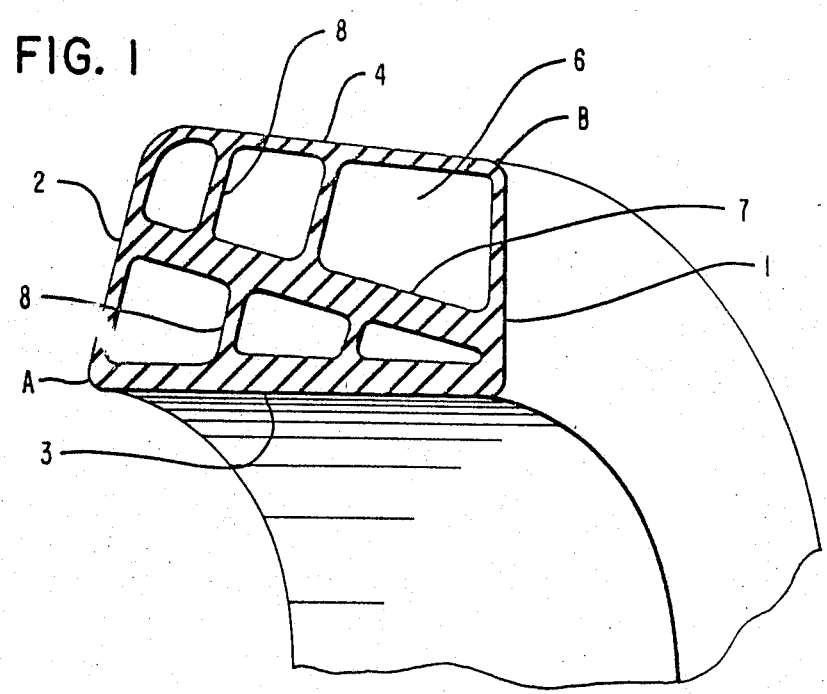
FIG. 1 is a partial perspective and cross-sectional view of one exemplary embodiment of the inventive filler ring with six circumferential hollow chambers disposed in two planes.

Referring now to the drawings in detail, the filler ring illustrated in FIG. 1 includes a side wall 1 that extends vertically or at right angles relative to an axis of rotation, and also, after installation, rests against a tire bead. The opposite side wall 2 is inclined at an angle of approximately 10° relative to the vertical, in conformity with the angle of inclination of the wall of a drop-center rim.

The radially inner wall 3 of the filler ring extends essentially parallel to the axis of rotation, whereas the radially outer wall 4 extends at an angle thereto, so that in that region that faces the drop center of the rim, the wall 4 has the greatest filler ring diameter. In this embodiment, the annular or circumferential hollow chambers 6 are disposed in two planes, with these two planes being separated from one another by an inner wall 7. This inner wall 7 rises in a radially outward direction from an axially outer end toward an axially inner end, with the radially outer part of the inner wall 7 meeting the side wall 2.

Each of the two planes is provided with three hollow chambers 6, with the chambers 6 of a given plane of chambers being separated from one another by thin partitions 8. The partitions 8 of one of the two planes of hollow chambers 6 are offset relative to the partitions 8 of the other plane of chamber 6. The three hollow chambers 6 disposed in the radially inner plane of chambers each have approximately the same axial dimension, whereas the axial dimensions of the three hollow chambers 6 in the radially outer plane of chambers decrease from axially outwardly to axially inwardly.

To facilitate installation, the filler ring illustrated in FIG. 1 is optimized pursuant to the finite elements method, with the essential point being that the locations A and B be more yielding than the other two edges. In addition to the cross-sectional contour illustrated in FIG. 1, this is primarily achieved by making the outer walls 1, 2, and 4, as well as the partitions 8, very thin (approximately 1 mm thickness), whereas the walls 3 and 7 should have a thickness of approximately 3 mm, however with the exception that the wall 3 should have a thickness of approximately 2 mm along the length of the axially and radially inner hollow chamber 6.

Figure 2:
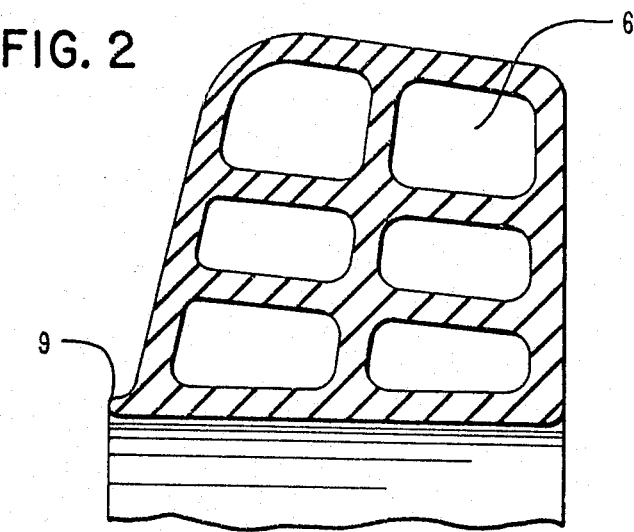
FIG. 2 is a partial radial cross-sectional view of another exemplary embodiment of the inventive filling ring with six circumferential hollow chambers disposed in three planes.

The filler ring of FIG. 2 differs from that of FIG. 1 primarily in that the six circumferential hollow chambers 6 are disposed in three radial planes, so that each plane has two adjacent hollow chambers. In this embodiment, the thicknesses of the outer and inner walls are approximately the same. This filler ring is provided for use with drop-center rims where the drop center is relatively deep. A special feature of this embodiment is the nose or projection 9, which is disposed on the radially and axially inner side of the filler ring, and extends around the transition zone from the side wall of the drop center to the base of the drop center of the associated rim.

Figure 3:
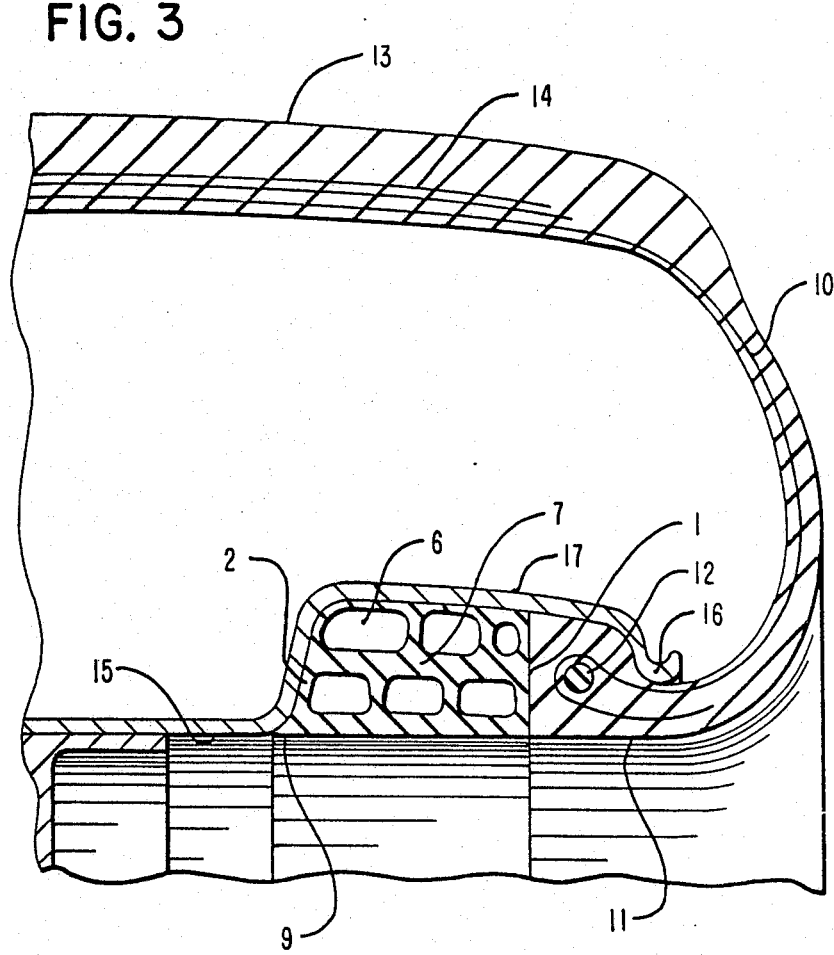
FIG. 3 is a partial radial cross-sectional view of a vehicle wheel and tire assembly in which has been installed a further exemplary embodiment of the inventive filler ring.

The partial radial cross-sectional view of FIG. 3 shows a vehicle wheel and tire assembly in which is installed a further exemplary embodiment of the inventive filler ring. The pneumatic vehicle tire, which comprises rubber or rubber-like synthetic material, has a carcass 10 that is anchored in the beads 11 by being looped around essentially inextensible and compression-resistant bead cores 12. Disposed between the tread 13 and the carcass 10 is a conventional reinforcing belt 14. The tire beads 11 are disposed on the radially inner periphery of a drop-center rim 15 next to rim flanges 16 that extend essentially radially inwardly. Those portions 17 of the rim 15 that are disposed axially inwardly of the rim flanges 16 serve as emergency support surfaces to support the tire in the event of a blow out or loss of pressure. The rim portion 17 extends at an angle in the transverse direction, so that a recessed mounting portion is formed for the tire on the radially inner side of the rim next to the tire beads 11.

After the tire has been mounted in the one-piece rim 15, the space adjacent the tire beads 11, which includes the recessed mounting portions, is closed off by a filler ring of the aforementioned type, so that no dirty water and spray can enter this space.

In the embodiment illustrated in FIG. 3, the filler ring has a total of six circumferential hollow chambers 6 that are disposed in two radial planes, each of which has three such chambers. In contrast to the embodiment of FIG. 1, the inner wall 7, which separates the hollow chambers 6 of one of the two planes from the hollow chambers of the other plane, extends approximately parallel to the axis of rotation of the filler ring, i.e. approximately parallel to the radially inner wall 3. The filler ring of this embodiment also has an annular or circumferential projection 9 on the axially and radially inner edge.

The above described filler rings are preferably made of a rubber having a Shore A hardness of between 80 and 90, and having an elongation of greater than 250% pursuant to DIN (German industrial norm) 53504. The material density should be approximately 1.40 g/cm$^3$.

The present invention is, of course, in no way restricted to the specific disclosure of the specification and drawings, but also encompasses any modifications within the scope of the appended claims.

What we claim is:

1. In filler ring for a vehicle wheel and pneumatic tire assembly where the beads of the tire are mounted on the radially inner periphery of a wheel rim next to essentially radially inwardly extending rim flanges, with said filler ring covering a space located axially inwardly of a given rim flange, the improvement wherein:
said filler ring comprises at least two different planes of circumferential hollow chambers, with these different planes being separated as spaced from one another via a predetermined cross-sectional contour and with said different planes of hollow chambers being superimposed on one another in a radial direction, and with each of said different planes of hollow chambers being provided with at least two hollow chambers successively arranged in an axial direction in each of said different planes overall having a total of up to six hollow chambers in each said filler ring, said predetermined cross-sectional contour of the filler ring assuring that even during slight movements of the tire bead under extreme driving conditions that the filler ring is kept from breaking away radially inwardly at specific locations and thus fully maintains the sealing effect thereof.

2. A filler ring according to claim 1, which includes two planes of hollow chambers superimposed on one another in the radial direction, with each of said planes being provided with three hollow chambers successively arranged in the axial direction.

3. A filler ring according to claim 2, which includes an inner wall which separates said hollow chambers of one of said planes of hollow chambers from said hollow chambers of the other of said planes, with said inner wall rising from an axially outer end thereof toward an axially inner end thereof, so that the diameter of said axially inner end of said inner wall is greater than the diameter of said axially outer end thereof; and in which said filler ring has a radially inwardly facing wall with a thickness approximately equal to the thickness of said inner wall.

4. A filler ring according to claim 2, which has oppositely disposed, essentially radially extending side walls, and partitions which separate said hollow chambers of a given plane of such hollow chambers, with said partitions of one of said planes of hollow chambers being offset from said partitions of the other of said planes, and with the thickness of said partitions being approximately equal to the thickness of said side walls.

5. A filler ring according to claim 2, which includes a radially inwardly facing wall, and an inner wall which separates said hollow chambers of one of said planes of hollow chambers from said hollow chambers of the other of said planes, with said inner wall extending approximately parallel to said inwardly facing wall.

6. A filler ring according to claim 1, which has an axis of rotation, oppositely disposed and essentially radially extending side walls, a radially inwardly facing wall, and a radially outwardly facing wall, with one of said side walls resting against a tire bead and extending at right angles to said axis of rotation, with the other of said side walls extending at approximately an 80° angle to said axis of rotation, and with said inwardly facing wall having a thickness that is greater than said side walls and said outwardly facing wall.

7. A filler ring according to claim 1, which has four walls that join one another to form four edges, with the axial inner edge and the diagonally opposite edge being more yielding to external compressive forces than are the two remaining edges.

8. A filler ring according to claim 1, which is made of rubber having a Shore A hardness of from 80 to 90, and an elongation of greater than 250%.

9. A filler ring according to claim 1, which includes three planes of hollow chambers superimposed on one another in the radial direction, with each of said planes being provided with two hollow chambers disposed adjacent one another in the axial direction.

10. A filler ring according to claim 1, which has an axially and radially inwardly directed edge on which is provided a circumferential projection.

* * * * *